US012344822B2

(12) United States Patent
Cai et al.

(10) Patent No.: US 12,344,822 B2
(45) Date of Patent: Jul. 1, 2025

(54) ANTIMICROBIAL DETERGENT COMPOSITION COMPRISING A POLYESTER-POLYETHER POLYMER AND A HALOGENATED PHENOL ANTIMICROBIAL AGENT MIXTURE

(71) Applicants: NICE ZHEJIANG TECHNOLOGY CO., LTD., Zhejiang (CN); NICE GROUP, Zhejiang (CN)

(72) Inventors: Guoqiang Cai, Zhejiang (CN); Qing Zhang, Zhejiang (CN); Yibo He, Zhejiang (CN); Meilin He, Zhejiang (CN); Xiangliang Xu, Zhejiang (CN); Lei Zhang, Zhejiang (CN)

(73) Assignees: NICE ZHEJIANG TECHNOLOGY CO., LTD., Zhejiang (CN); NICE GROUP, Zhejiang (CN)

( * ) Notice: Subject to any disclaimer, the term of this patent is extended or adjusted under 35 U.S.C. 154(b) by 544 days.

(21) Appl. No.: 17/762,090

(22) PCT Filed: May 6, 2021

(86) PCT No.: PCT/CN2021/091838

§ 371 (c)(1),
(2) Date: Mar. 21, 2022

(87) PCT Pub. No.: WO2022/007491

PCT Pub. Date: Jan. 13, 2022

(65) Prior Publication Data

US 2022/0348846 A1 Nov. 3, 2022

(30) Foreign Application Priority Data

Jul. 10, 2020 (CN) ......................... 202010666472.6

(51) Int. Cl.

| | |
|---|---|
| ***C11D 3/48*** | (2006.01) |
| ***C11D 1/52*** | (2006.01) |
| ***C11D 3/20*** | (2006.01) |
| ***C11D 3/37*** | (2006.01) |

(52) U.S. Cl.

CPC .............. *C11D 3/3715* (2013.01); *C11D 1/52* (2013.01); *C11D 3/2024* (2013.01); *C11D 3/3707* (2013.01); *C11D 3/48* (2013.01); *C11D 2111/12* (2024.01)

(58) Field of Classification Search

CPC .... C11D 1/12; C11D 1/72; C11D 1/83; C11D 3/2003; C11D 3/2006; C11D 3/2041; C11D 3/2068; C11D 3/3707; C11D 3/3715; C11D 3/43; C11D 3/48; C11D 7/50; C11D 7/5077; C11D 2111/12

See application file for complete search history.

(56) References Cited

U.S. PATENT DOCUMENTS

| | | | | |
|---|---|---|---|---|
| 2009/0088362 A1* | 4/2009 | Lant ........................ | C11D 3/507 510/276 |
| 2016/0000080 A1* | 1/2016 | Pilz ........................ | A01N 43/90 514/470 |
| 2016/0319226 A1* | 11/2016 | Lant ................... | C11D 3/38636 |
| 2022/0010236 A1* | 1/2022 | Shearouse ............ | C11D 17/043 |

FOREIGN PATENT DOCUMENTS

| | | | |
|---|---|---|---|
| WO | 2017051776 | | 3/2017 |
| WO | 2019112041 | * | 6/2019 |

OTHER PUBLICATIONS

"International Search Report (Form PCT/ISA/210) of PCT/CN2021/091838," mailed on Aug. 11, 2021, with English translation thereof, pp. 1-4.

* cited by examiner

*Primary Examiner* — Charles I Boyer
(74) *Attorney, Agent, or Firm* — JCIPRNET

(57) ABSTRACT

An antimicrobial detergent composition includes the following components by mass percent: 0.1-10% of a polyester-polyether polymer, 0.01-2% of an antimicrobial agent with a halogenated phenol structure, 10-50% of a surfactant and a solvent. A 1% deionized water solution of the detergent composition has a pH value of 7.0-9.0. In the present invention, by introducing the polyester-polyether polymer into the composition, the deposition efficiency of the antimicrobial agent with the halogenated phenol structure on a fabric can be improved, a solubilization effect of the surfactant in a detergent can be reduced, and therefore, a antimicrobial effect is achieved.

10 Claims, No Drawings

ANTIMICROBIAL DETERGENT COMPOSITION COMPRISING A POLYESTER-POLYETHER POLYMER AND A HALOGENATED PHENOL ANTIMICROBIAL AGENT MIXTURE

This is a 371 application of the International PCT application serial no. PCT/CN2021/091838, filed on May 6, 2021, which claims the priority benefits of China application 202010666472.6, filed on Jul. 10, 2020. The entirety of each of the above-mentioned patent applications is hereby incorporated by reference herein and made a part of this specification.

TECHNICAL FIELD

The present invention relates to the field of detergents, and in particular to an antimicrobial detergent composition.

DESCRIPTION OF RELATED ART

With improvement of living standards, consumers have paid attention to the functionality of detergents in addition to conventional decontamination requirements for the detergents. After the outbreak of the novel coronavirus pneumonia epidemic, the consumers have paid special attention to an antimicrobial function of the detergents. As microorganisms on fabrics are instantly killed and removed during washing, the consumers also expect that the washed fabrics can maintain an antimicrobial or microbial-inhibiting effect for a long time. Thus, it is required that an antimicrobial agent in the detergents is effectively deposited on the fabrics during the washing. However, the detergents have a basic decontamination function. Substances on the fabrics are washed off by using a surfactant as a main active ingredient of the detergents, and then discharged with a bleaching liquid in a rinsing process. This situation is contradictory with deposition of the antimicrobial agent on the fabrics, so that the deposition efficiency of the antimicrobial agent on the fabrics is low, and a large amount of the antimicrobial agent is discharged with the bleaching liquid without deposition. Not only is a long-lasting antimicrobial effect of a detergent composition affected, but also a lot of waste is caused, and a burden on the environment may be caused. It is already known that an antimicrobial agent with a halogenated phenol structure, such as chlorodimethylphenol, has antimicrobial efficacy. Such substance generally has poor water solubility and a tendency to precipitate out of a solution and deposit on a fabric. However, due to a solubilization effect of the surfactant, the deposition efficiency is greatly affected. Therefore, it is required to develop a detergent composition that can improve the deposition efficiency of an antimicrobial agent with a halogenated phenol structure on a fabric.

SUMMARY

In order to solve the technical problems above, the present invention provides an antimicrobial detergent composition. In the present invention, by introducing a polyester-polyether polymer into a composition, the deposition efficiency of an antimicrobial agent with a halogenated phenol structure on a fabric can be improved, a solubilization effect of a surfactant in a detergent can be reduced, and therefore, a more significant and long-lasting antimicrobial effect is achieved.

The present invention has the following technical solutions: In a first aspect, the present invention provides an antimicrobial detergent composition. The antimicrobial detergent composition includes the following components by mass percent:

0.1-10% of a polyester-polyether polymer, 0.01-2% of an antimicrobial agent with a halogenated phenol structure, 10-50% of a surfactant and a solvent.

A 1% deionized water solution of the detergent composition has a pH value of 7.0-9.0.

It is already known that the antimicrobial agent with a halogenated phenol structure has an excellent antimicrobial effect. However, the antimicrobial agent has poor water solubility. The surfactant in the detergent has a solubilization effect on the antimicrobial agent, so that the deposition efficiency of the antimicrobial agent on a fabric is affected. The polyester-polyether polymer is an amphiphilic copolymer that can be deposited onto a polyester cloth, and includes a hydrophobic segment with a large number of benzene rings. It is found by inventors of the present application that when the polyester-polyether polymer and the antimicrobial agent with a halogenated phenol structure are compounded in the detergent according to a specific concentration, the antimicrobial agent with a halogenated phenol structure can interact with the polyester-polyether polymer through both a hydrophobic interaction and a $\pi$-$\pi$stacking effect. When the polyester-polyether polymer is efficiently deposited on a fabric, deposition of the antimicrobial agent on the fabric is also facilitated, so that the deposition efficiency is improved.

Preferably, the polyester-polyether polymer and the antimicrobial agent with a halogenated phenol structure are pre-mixed in the following steps:

a) dissolving the antimicrobial agent with a halogenated phenol structure into an alcohol ether to prepare a solution A with a concentration of 20-40 wt %;

b) dissolving the polyester-polyether polymer into an alcohol ether to prepare a solution B with a concentration of 40-70 wt %;

c) conducting stirring mixing on the solution A and the solution B to obtain a uniform solution; and d) slowly adding water into the uniform solution obtained in step c) for stirring to obtain a uniform compound solution.

It is further found by the inventors that the two substances are pre-mixed under specific conditions above. First, the two substances are uniformly mixed in an alcohol ether solvent. Then, water, as a poor solvent for the antimicrobial agent, is slowly added dropwise under controlled conditions, so that the antimicrobial agent and the polyester-polyether polymer are fully strengthened through the hydrophobic interaction and the $\pi$-$\pi$ stacking effect between the benzene rings to form a compound. Next, the compound is added into the detergent composition so that the deposition efficiency of the antimicrobial agent can be further greatly improved. This may be because the compound formed by the two substances is relatively stable. The solubilization effect of the surfactant on the antimicrobial agent can be further reduced, and the deposition of the antimicrobial agent on the fabric with the polyester-polyether polymer is facilitated. Preparation conditions of the compound need to be controlled to prevent the situation that as the antimicrobial agent is obviously precipitated out of a system and then precipitated, a stable compound solution cannot be formed.

Preferably, in step a) and step b), the alcohol ether is one or more selected from the group consisting of isopropanol, 1,2-propanediol, dipropylene glycol, diethylene glycol butyl ether and ethylene glycol.

Preferably, in step c), a mass ratio of the polyester-polyether polymer to the antimicrobial agent is 1:1-20:1, and a mass ratio of the alcohol ether to the antimicrobial agent is 3:1-10:1. Preferably, in step d), a mass ratio of the alcohol ether to the water is 1:1-3:1.

Preferably, the polyester-polyether polymer is a polymer that can be deposited onto a polyester cloth from a washing solution, and is a commercially available product known in the art. Preferably, the polyester-polyether polymer includes a fabric-friendly segment formed by a condensation reaction of a terephthalate and a diol, and further includes a hydrophilic segment including a segment consisting of ethylene oxide repeating units. Preferably, the diol is one or more selected from the group consisting of ethylene glycol, 1,2-propanediol and 1,3-propanediol. A particularly effective polyester-polyether polymer may include Repel-O-Tex series products in Solvay Company and TexCare SRN series products in Clariant Company.

Preferably, the antimicrobial agent with a halogenated phenol structure has the following structure:

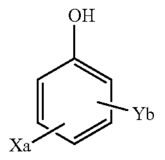

where each X is independently selected from the group consisting of chlorine and bromine, and a is 1, 2 or 3; and each Y is independently selected from the group consisting of a C1-C4 alkyl and a halophenoxy, and b is 1, 2 or 3.

Preferably, the halophenoxy has a structure of

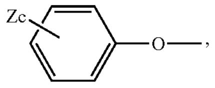

where each Z is independently selected from the group consisting of chlorine and bromine, and c is 1, 2 or 3.

Further preferably, the antimicrobial agent is one or more selected from the group consisting of 5-chloro-2-(2,4-dichlorophenoxy)phenol, chlorodimethylphenol and 5-chloro-2-(4-chlorophenoxy)phenol. More preferably, the antimicrobial agent is the 5-chloro-2-(4-chlorophenoxy)phenol, which may be a product with a trade name of Tinosan HP100 in BASF company.

Preferably, the surfactant includes one or more selected from the group consisting of an anionic surfactant, a nonionic surfactant and a zwitterionic surfactant.

Further, the anionic surfactant includes but is not limited to one or more selected from the group consisting of a fatty alcohol polyoxyethylene ether sulfate, a fatty alcohol polyoxyethylene ether carboxylate, a linear alkyl benzene sulfonate, an olefin sulfonate, a fatty acid salt, a fatty acid methyl ester sulfonate, a glycerol monolaurate sulfate, a lauroyl sarcosinate and a lauryl sulfate.

Further, the nonionic surfactant includes but is not limited to one or more selected from the group consisting of alkyl glycoside, cocamide monoethanolamine, cocamide diethanolamine, fatty alcohol polyoxyethylene ether, fatty alcohol polyoxyethylene polyoxypropylene ether, fatty acid methyl ester ethoxylate, glycerol ethoxylate and fatty amine polyoxyethylene ether.

Further, the zwitterionic surfactant includes but is not limited to one or more selected from the group consisting of alkyl dimethyl betaine, cocamidopropyl betaine, alkyl dimethyl sulfoethyl betaine, alkyl aminopropionic acid and alkyl dimethylamine oxide.

Preferably, the detergent composition further includes one or more selected from the group consisting of a chelator, a brightener, an anti-redeposition agent, an enzyme preparation, a preservative, an inorganic salt, a dye transfer inhibitor, a flavor and a pigment.

In a second aspect, the present invention further provides a method for preprocessing or processing a fabric. The method includes adding the antimicrobial detergent composition into water according to a dilution multiple of at least 300 times to form a detergent solution, and then making the detergent solution get in contact with the fabric.

Preferably, the fabric includes a chemical fiber. Further, the chemical fiber is a polyester fiber.

Compared with prior art, the present invention has the following technical effects. In the antimicrobial detergent composition of the present invention, by using the polyester-polyether polymer and the antimicrobial agent with a halogenated phenol structure in combination, a deposition rate of the antimicrobial agent on a fabric can be improved. And if the two substances are pre-mixed according to a specific method to form a compound, the deposition efficiency of the antimicrobial agent can be further improved, and the antimicrobial effect of the detergent composition is further improved.

DESCRIPTION OF THE EMBODIMENTS

The present invention is further described below in conjunction with examples.

General Example

An antimicrobial detergent composition includes the following components by mass percent:

0.1-10% of a polyester-polyether polymer, 0.01-2% of an antimicrobial agent with a halogenated phenol structure, 10-50% of a surfactant and a solvent.

A 1% deionized water solution of the detergent composition has a pH value of 7.0-9.0.

Preferably, the polyester-polyether polymer and the antimicrobial agent with a halogenated phenol structure are pre-mixed in the following steps:

a) dissolving the antimicrobial agent with a halogenated phenol structure into an alcohol ether to prepare a solution A with a concentration of 20-40 wt %;

b) dissolving the polyester-polyether polymer into an alcohol ether to prepare a solution B with a concentration of 40-70 wt %;

c) conducting stirring mixing on the solution A and the solution B to obtain a uniform solution; and d) slowly adding water into the uniform solution obtained in step c) for stirring to obtain a uniform compound solution.

Preferably, the alcohol ether is one or more selected from the group consisting of isopropanol, 1,2-propanediol, dipropylene glycol, diethylene glycol butyl ether and ethylene glycol. A mass ratio of the polyester-polyether polymer to the antimicrobial agent is 1:1-20:1. A mass ratio of the alcohol ether to the antimicrobial agent is 3:1-10:1. A mass ratio of the alcohol ether to the water is 1:1-3:1.

Preferably, the polyester-polyether polymer includes a fabric-friendly segment formed by a condensation reaction of a terephthalate and a diol, and further includes a hydrophilic segment including a segment consisting of ethylene oxide repeating units. Preferably, the diol is one or more selected from the group consisting of ethylene glycol, 1,2-propanediol and 1,3-propanediol. A particularly effective polyester-polyether polymer may include Repel-O-Tex series products in Solvay Company and TexCare SRN series products in Clariant Company.

Preferably, the antimicrobial agent with a halogenated phenol structure has the following structure:

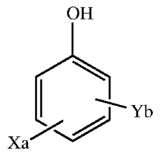

where each X is independently selected from the group consisting of chlorine and bromine, and a is 1, 2 or 3; and each Y is independently selected from the group consisting of a C1-C4 alkyl and a halophenoxy, and b is 1, 2 or 3.

Preferably, the halophenoxy has a structure of

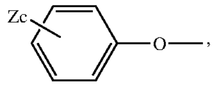

where each Z is independently selected from the group consisting of chlorine and bromine, and c is 1, 2 or 3.

Further preferably, the antimicrobial agent is one or more selected from the group consisting of 5-chloro-2-(2,4-dichlorophenoxy)phenol, chlorodimethylphenol and 5-chloro-2-(4-chlorophenoxy)phenol. More preferably, the antimicrobial agent is the 5-chloro-2-(4-chlorophenoxy)phenol, which may be a product with a trade name of Tinosan HP100 in BASF company.

Preferably, the surfactant includes one or more selected from the group consisting of an anionic surfactant, a nonionic surfactant and a zwitterionic surfactant.

Further, the anionic surfactant includes but is not limited to one or more selected from the group consisting of a fatty alcohol polyoxyethylene ether sulfate, a fatty alcohol polyoxyethylene ether carboxylate, a linear alkyl benzene sulfonate, an olefin sulfonate, a fatty acid salt, a fatty acid methyl ester sulfonate, a glycerol monolaurate sulfate, a lauroyl sarcosinate and a lauryl sulfate.

Further, the nonionic surfactant includes but is not limited to one or more selected from the group consisting of alkyl glycoside, cocamide monoethanolamine, cocamide diethanolamine, fatty alcohol polyoxyethylene ether, fatty alcohol polyoxyethylene polyoxypropylene ether, fatty acid methyl ester ethoxylate, glycerol ethoxylate and fatty amine polyoxyethylene ether.

Further, the zwitterionic surfactant includes but is not limited to one or more selected from the group consisting of alkyl dimethyl betaine, cocamidopropyl betaine, alkyl dimethyl sulfoethyl betaine, alkyl aminopropionic acid and alkyl dimethylamine oxide.

Preferably, the detergent composition further includes one or more selected from the group consisting of a chelator, a brightener, an anti-redeposition agent, an enzyme preparation, a preservative, an inorganic salt, a dye transfer inhibitor, a flavor and a pigment.

A method for preprocessing or processing a fabric includes adding the antimicrobial detergent composition into water according to a dilution multiple of at least 300 times to form a detergent solution, and then making the detergent solution get in contact with the fabric. Preferably, the fabric includes a chemical fiber. Further, the chemical fiber is a polyester fiber.

Specific examples and test experiments A white pure cotton cloth and a white polyester cloth were used as cloth samples in the present invention. The cloth samples were preprocessed before use to remove organic matter from fabrics. The white cloths were cut into cloth pieces with a size of 6 cm*6 cm, boiled in a 5 g/L soda solution for 1 h and rinsed several times. Then, the white cloths were subjected to reflux treatment with isopropanol for 3 h, rinsed and then dried for later use.

An antimicrobial agent was determined by using a UPLC-PDA technology. Pure water, acetonitrile and 200 mmol/L ammonium acetate were used as a mobile phase. A C18 column was used as a separation column. The antimicrobial agent was separated out by using a gradient rinsing procedure, and detected in a PDA mode. With 5-chloro-2-(4-dichlorophenoxy)phenol as an example, the peak time was 10.5 min, and the maximum ultraviolet absorption wavelength was 278 nm. A standard curve for the antimicrobial agent in a concentration range of 0.5 ppm-50 ppm was drawn according to the same procedure.

The antimicrobial agent deposited on the fabrics was determined by using the following method.

1.1 L of an antimicrobial detergent solution with a concentration of 0.2% was prepared by using hard water with a hardness of 250 ppm ($Ca^{2+}$:$Mg^{2+}$=3:2). 10 g of the cloth samples were put into the solution, washed in a vertical decontamination machine at 120 rpm and 30° C. for 20 min, rinsed 2 times, taken out and then air-dried. Washing was repeated 5 times.

2.5 g of the cloth samples processed in step 1 were weighed. The antimicrobial agent on the cloth samples was subjected to ultrasonic extraction collection with 25 ml of isopropanol.

3. An extract obtained in step 2 was filtered with a 0.22 μm oily filter head, detected by using the UPLC-PDA and then quantified according to the standard curve. The mass of the antimicrobial agent deposited on a fabric was converted.

A deposition rate of the antimicrobial agent was calculated according to the following formula:

$$\text{depostion rate of antimicrobial agent} = \frac{\text{mass of antimicrobial agent on fabric}}{\begin{array}{c}\text{total mass of antimicrobial agent}\\ \text{in washing environment}\end{array}} \times 100\%$$

The antimicrobial performance of the detergent composition was tested.

A. The white polyester cloth was cut into round cloth pieces with a diameter of 20 mm and sterilized by pressure steam for 15 min for later use. 100 ml of a 0.2% detergent solution was prepared by using sterilized hard water with a hardness of 250 ppm in a sterilized conical flask. 3 round cloth pieces were put into the flask, and washing was simulated in a constant-temperature shaking box at 30° C. for 20 min. Then the detergent solution was discarded. The round cloth pieces were rinsed 2 times with 100 ml of sterilized distilled water, taken out and then dried at room temperature for 24 h. Washing was repeated 5 times.

B. A bacteria-bearing culture medium was prepared. 25 g of a tryptone soybean agar culture medium was weighed for solidification. 1 ml of a *Staphylococcus aureus* bacterial liquid ($10^6$ cfu/ml) was sucked onto the culture medium. The culture dish was shaken back and forth to make the bacterial liquid cover a surface completely and uniformly, and then dried for 15 min for later use.

C. The round cloth pieces dried in step A were spread on a surface of the bacteria-bearing culture medium and cultured at 37° C. for 24 h. The diameter of a bacteria inhibition ring (including the diameter of the round cloth piece) was measured by using a vernier caliper and then recorded. Each test was repeated 3 times to obtain an average value.

Information of partial reagents used in the examples was as follows: LAS: linear alkyl benzene sulfonic acid;
AES: fatty alcohol polyoxyethylene ether sodium sulfate;
AEO-9: fatty alcohol polyoxyethylene ether with an average polyoxyethylation degree of 9;
CAB: cocamidopropyl betaine;
EDTA-2Na: ethylenediaminetetraacetic acid disodium salt;
CBS: sodium distyrylbiphenyl disulfonate;
SRP: polyester-polyether polymer;
OA-12: dodecyl dimethylamine oxide; and
OIT: 2-octyl-3(2H)-isothiazolone.

A preparation process of a compound 1 solution was as follows. With 1,2-propanediol as a solvent, 5-chloro-2-(4-chlorophenoxy)phenol and SRP were prepared into solutions with a mass fraction of 30% and 50% respectively. 10 g of the 30% 5-chloro-2-(4-chlorophenoxy)phenol solution and 30 g of the 50% SRP solution were weighed and stirred uniformly. 20 g of deionized water was slowly added dropwise into a mixture solution obtained above and stirred uniformly to obtain the compound 1 solution.

A preparation process of a compound 2 solution was as follows. With 1,2-propanediol as a solvent, 5-chloro-2-(4-chlorophenoxy)phenol and SRP were prepared into solutions with a mass fraction of 20% and 70% respectively. 10 g of the 20% 5-chloro-2-(4-chlorophenoxy)phenol solution and 10 g of the 70% SRP solution were weighed and stirred uniformly. 5 g of deionized water was slowly added dropwise into a mixture solution obtained above and stirred uniformly to obtain the compound 2 solution.

TABLE 1

Components of antimicrobial detergent compositions

| Component | Example 1 Mass % | Example 2 Mass % | Example 3 Mass % | Example 4 Mass % | Example 5 Mass % | Example 6 Mass % |
|---|---|---|---|---|---|---|
| LAS | 3.5 | 3.5 | 3.5 | 7.5 | 7.5 | 7.5 |
| AES | 7.0 | 7.0 | 7.0 | 14.0 | 14.0 | 14.0 |
| AEO-9 | 2.5 | 2.5 | 2.5 | 3.2 | 3.2 | 3.2 |
| Cocinic acid | 1.0 | 1.0 | 1.0 | 1.2 | 1.2 | 1.2 |
| OA-12 | 1.0 | 1.0 | 1.0 | / | / | / |
| CAB | / | / | / | 1.0 | 1.0 | 1.0 |
| Sodium citrate | 1.0 | 1.0 | 1.0 | 1.0 | 1.0 | 1.0 |
| EDTA-2Na | 0.1 | 0.1 | 0.1 | 0.2 | 0.2 | 0.2 |
| Protease | 0.1 | 0.1 | 0.1 | 0.1 | 0.1 | 0.1 |
| 5-chloro-2-(4-chlorophenoxy)phenol | 0.1 | 0.1 | / | 0.04 | 0.04 | / |
| SRP | / | 0.5 | / | / | 0.14 | / |
| 1,2-propanediol | 0.75 | 0.75 | / | 2.22 | 2.22 | 2.0/ |
| Compound 1 solution | / | / | 2.0 | / | / | / |
| Compound 2 solution | / | / | / | / | / | 0.5 |
| Water | Balance | Balance | Balance | Balance | Balance | Balance |

The pH of systems above was adjusted to 8.0±0.5 by using a 32% sodium hydroxide solution.

TABLE 2

Results of deposition rates of antimicrobial agents in antimicrobial detergent compositions

| | Example 1 | Example 2 | Example 3 | Example 4 | Example 5 | Example 6 |
|---|---|---|---|---|---|---|
| White pure cotton cloth | 7.12% | 7.18% | 7.21% | 9.53% | 9.59% | 9.67% |
| Increase degree | / | 0.84% | 1.26% | / | 0.42% | 1.47% |
| White polyester cloth | 6.42% | 6.65% | 7.05% | 6.76% | 7.12% | 7.68% |
| Increase degree | / | 3.58% | 9.81% | / | 5.32% | 13.61% |

From the tables above, it could be seen that the deposition rate of an antimicrobial agent on a white pure cotton cloth was slight increased by using a polyester-polyether polymer. However, the deposition rate of the antimicrobial agent on a polyester cloth could be significantly increased by introducing a polyester-polyether polymer into the composition. However, when the polyester-polyether polymer and the antimicrobial agent were pre-mixed to form a compound and then the compound was added into the composition, the deposition rate of HP100 on the polyester cloth could be further significantly increased. It was indicated that the deposition of the antimicrobial agent on a fabric, especially the polyester cloth, was facilitated by using the polyester-polyether polymer.

TABLE 3

| Antimicrobial effect of detergent compositions | | | | | | |
|---|---|---|---|---|---|---|
| (mm) | Example 1 | Example 2 | Example 3 | Example 4 | Example 5 | Example 6 |
| White pure cotton cloth | 24.4 | 24.6 | 24.8 | 23.5 | 23.5 | 23.8 |
| White polyester cloth | 22.0 | 22.8 | 23.9 | 21.9 | 22.5 | 23.6 |

When a bacteria inhibition ring was larger, a diffusion range of an antimicrobial agent on a fabric was wider, and the fabric had a better long-lasting antimicrobial effect. There were small differences in the deposition rate of the antimicrobial agent on pure cotton cloths. Therefore, differences in the size of the bacteria inhibition ring were not obvious. However, the deposition rate of the antimicrobial agent on a polyester cloth washed with the detergent composition added with the polyester-polyether polymer was significantly increased. Especially when the polyester-polyether polymer and the antimicrobial agent were pre-mixed to form a compound, it could be seen that a fabric washed with the composition had a significantly larger bacteria inhibition ring, indicating that the fabric had a better antimicrobial effect.

A preparation process of a compound 3 solution was as follows. With isopropanol as a solvent, chlorodimethylphenol and SRP were prepared into solutions with a mass fraction of 40% and 40% respectively. 10 g of the 40% chlorodimethylphenol solution and 10 g of the 40% SRP solution were weighed and stirred uniformly. 4 g of deionized water was slowly added dropwise into a mixture solution obtained above and stirred uniformly to obtain the compound 3 solution.

A preparation process of a compound 4 solution was as follows. With dipropylene glycol as a solvent, 5-chloro-2-(4-chlorophenoxy)phenol and SRP were prepared into solutions with a mass fraction of 20% and 60% respectively. 10 g of the 20% 5-chloro-2-(4-chlorophenoxy)phenol solution and 30 g of the 60% SRP solution were weighed and stirred uniformly. 10 g of deionized water was slowly added dropwise into a mixture solution obtained above and stirred uniformly to obtain the compound 4 solution.

TABLE 4

| Components of antimicrobial detergent compositions | | | | | | |
|---|---|---|---|---|---|---|
| Component | Example 7 Mass % | Example 8 Mass % | Example 9 Mass % | Example 10 Mass % | Example 11 Mass % | Example 12 Mass % |
| LAS | 16.5 | 16.5 | 16.5 | 5.0 | 5.0 | 5.0 |
| AES | 14.0 | 14.0 | 14.0 | 4.2 | 4.2 | 4.2 |
| AEO-9 | 8.5 | 8.5 | 8.5 | 3.2 | 3.2 | 3.2 |
| Cocinic acid | 4.0 | 4.0 | 4.0 | 1.0 | 1.0 | 1.0 |
| OA-12 | 3.0 | 3.0 | 3.0 | / | / | / |
| CAB | / | / | / | 1.0 | 1.0 | 1.0 |
| Sodium citrate | 1.0 | 1.0 | 1.0 | 1.0 | 1.0 | 1.0 |
| EDTA-2Na | 0.2 | 0.2 | 0.2 | 0.1 | 0.1 | 0.1 |
| Protease | 0.2 | 0.2 | 0.2 | 0.1 | 0.1 | 0.1 |
| Chlorodimethylphenol | 1.0 | 1.0 | / | / | / | / |
| 5-chloro-2-(4-chlorophenoxy)phenol | / | / | / | 0.4 | 0.4 | / |
| SRP | / | 1.0 | / | / | 3.6 | / |
| Isopropanol | 8.0 | 8.0 | 5.0 | / | / | / |
| Dipropylene glycol | / | / | / | 4.0 | 4.0 | / |
| Compound 3 solution | / | / | 6.0 | / | / | / |
| Compound 4 solution | / | / | / | / | / | 10.0 |
| Water | Balance | Balance | Balance | Balance | Balance | Balance |

The pH of systems above was adjusted to 8.0±0.5 by using a 32% sodium hydroxide solution.

TABLE 5

| Results of deposition rates of antimicrobial agents in antimicrobial detergent compositions | | | | | | |
|---|---|---|---|---|---|---|
| | Example 7 | Example 8 | Example 9 | Example 10 | Example 11 | Example 12 |
| White polyester cloth | 3.25% | 3.41% | 3.56% | 4.25% | 4.74% | 5.31% |
| Increase degree | / | 4.92% | 9.54% | / | 11.53% | 24.94% |

From the tables above, it could be seen that all the antimicrobial agents with halogenated phenol structures could interact with a polyester-polyether polymer. The deposition rate of the antimicrobial agent on a polyester cloth was significantly increased, especially when a compound was formed and added. In addition, in order to reduce a solubilization effect of a surfactant on the antimicrobial agent during washing, the amount of a nonionic surfactant with a low critical micelle concentration in a composition should not be too high (less than or equal to 25% of a total mass of the surfactant).

A preparation process of a compound 5 solution was as follows. With 1,2-propanediol as a solvent, 5-chloro-2-(4-chlorophenoxy)phenol and SRP were prepared into solutions with a mass fraction of 30% and 50% respectively. 10 g of the 30% 5-chloro-2-(4-chlorophenoxy)phenol solution and 5 g of the 50% SRP solution were weighed and stirred uniformly. 5 g of deionized water was slowly added dropwise into a mixture solution obtained above and stirred uniformly to obtain the compound 5 solution.

OIT has antimicrobial activity, but does not structurally include a benzene ring.

A preparation process of a compound 6 solution was as follows. With 1,2-propanediol as a solvent, OIT and SRP were prepared into solutions with a mass fraction of 30% and 50% respectively. 10 g of the 30% OIT solution and 30 g of the 50% SRP solution were weighed and stirred uniformly. 20 g of deionized water was slowly added dropwise into a mixture solution obtained above and stirred uniformly to obtain the compound 6 solution.

SRP through a hydrophobic interaction, a formed compound had low stability due to a surfactant in a system. As a result, the final deposition rate was not significantly increased.

Unless otherwise specified, raw materials and apparatuses used in the present invention are common raw materials and apparatuses in the art. Unless otherwise specified, methods used in the present invention are conventional methods in the art.

The descriptions above are only preferred examples of the present invention, and are not intended to limit the present invention in any way. Any simple modifications, changes and equivalent transformations made to the examples according to the technical essence of the present invention still fall within the protection scope of technical solutions of the present invention.

What is claimed is:

1. An antimicrobial detergent composition, comprising the following components by mass percent:

a compound formed by 0.1-10% of a polyester-polyether polymer and 0.01-2% of an antimicrobial agent with a halogenated phenol structure;

10-50% of a surfactant; and a solvent, wherein a 1% deionized water solution of the antimicrobial detergent composition has a pH value of 7.0-9.0, wherein the compound is formed by pre-mixing the polyester-polyether polymer and the antimicrobial agent with the halogenated phenol structure in the following steps:

TABLE 6

| Components of antimicrobial detergent compositions | | | | | | |
|---|---|---|---|---|---|---|
| Component | Example 13 Mass % | Example 14 Mass % | Example 15 Mass % | Example 16 Mass % | Example 17 Mass % | Example 18 Mass % |
| LAS | 3.5 | 3.5 | 3.5 | 7.5 | 7.5 | 7.5 |
| AES | 9.1 | 9.1 | 9.1 | 14.0 | 14.0 | 14.0 |
| AEO-9 | 2.5 | 2.5 | 2.5 | 3.2 | 3.2 | 3.2 |
| Cocinic acid | 1.0 | 1.0 | 1.0 | 1.2 | 1.2 | 1.2 |
| OA-12 | 1.0 | 1.0 | 1.0 | / | / | / |
| CAB | / | / | / | 1.0 | 1.0 | 1.0 |
| Sodium citrate | 1.0 | 1.0 | 1.0 | 1.0 | 1.0 | 1.0 |
| EDTA-2Na | 0.1 | 0.1 | 0.1 | 0.2 | 0.2 | 0.2 |
| Protease | 0.1 | 0.1 | 0.1 | 0.1 | 0.1 | 0.1 |
| 5-chloro-2-(4-chlorophenoxy)phenol | 0.45 | 0.45 | / | | | |
| OIT | | | | 0.1 | 0.1 | / |
| SRP | | 0.375 | / | / | 0.5 | / |
| 1,2-propanediol | 1.425 | 1.425 | / | 2.22 | 2.22 | 2.0 |
| Compound 5 solution | / | / | 3.0 | / | / | / |
| Compound 6 solution | / | / | / | / | / | 2.0 |
| Water | Balance | Balance | Balance | Balance | Balance | |

TABLE 7

| Results of deposition rates of antimicrobial agents in antimicrobial detergent compositions | | | | | | |
|---|---|---|---|---|---|---|
| | Example 13 | Example 14 | Example 15 | Example 16 | Example 17 | Example 18 |
| White polyester cloth | 5.25% | 5.28% | 5.37% | 6.37% | 6.35% | 6.51% |
| Increase degree | / | 0.57% | 2.28% | / | −0.31% | 2.19% |

From the tables above, it could be seen that when a weight ratio of a polyester-polyether polymer to an antimicrobial agent with a halogenated phenol structure was not in a limited range, the deposition rate of the antimicrobial agent on a fabric was difficult to effectively increase. However, an OIT molecule without a benzene ring could interact with a) dissolving the antimicrobial agent with the halogenated phenol structure into the solvent to prepare a solution A with a concentration of 20-40 wt %;

b) dissolving the polyester-polyether polymer into the solvent to prepare a solution B with a concentration of 40-70 wt %;

c) conducting stirring mixing on the solution A and the solution B to obtain a uniform solution; and d) slowly adding water into the uniform solution obtained in step c) for stirring to obtain a uniform compound solution, wherein in step a) and step b), the solvent is one or more selected from the group consisting of isopropanol, 1,2-propanediol, dipropylene glycol, diethylene glycol butyl ether and ethylene glycol;

wherein the polyester-polyether polymer comprises a fabric-friendly segment formed by a condensation reaction of a terephthalate and a diol, and a hydrophilic segment comprising a segment consisting of ethylene oxide repeating units;

wherein the antimicrobial agent is one or more selected from the group consisting of 5-chloro-2-(2,4-dichlorophenoxy) phenol, chlorodimethylphenol and 5-chloro-2-(4-chlorophenoxy) phenol.

2. The antimicrobial detergent composition according to claim 1, wherein in step c), a mass ratio of the polyester-polyether polymer to the antimicrobial agent is 3.5:1 to 20:1, and a mass ratio of the solvent to the antimicrobial agent is 3:1 to 10:1; and/or in step d), a mass ratio of the solvent to the water is 1:1 to 3:1.

3. The antimicrobial detergent composition according to claim 1, wherein the detergent composition further comprises one or more selected from the group consisting of a chelator, a brightener, an anti-redeposition agent, an enzyme preparation, a preservative, an inorganic salt, a dye transfer inhibitor, a flavor and a pigment.

4. A method for preprocessing or processing a fabric, comprising adding the antimicrobial detergent composition according to claim 1 into water according to a dilution multiple of at least 300 times to form a detergent solution, and then making the detergent solution get in contact with the fabric.

5. The method according to claim 4, wherein the fabric comprises a chemical fiber.

6. The method according to claim 5, wherein the chemical fiber is a polyester fiber.

7. A method for preprocessing or processing a fabric, comprising adding the antimicrobial detergent composition according to claim 2 into water according to a dilution multiple of at least 300 times to form a detergent solution, and then making the detergent solution get in contact with the fabric.

8. A method for preprocessing or processing a fabric, comprising adding the antimicrobial detergent composition according to claim 1 into water according to a dilution multiple of at least 300 times to form a detergent solution, and then making the detergent solution get in contact with the fabric.

9. A method for preprocessing or processing a fabric, comprising adding the antimicrobial detergent composition according to claim 3 into water according to a dilution multiple of at least 300 times to form a detergent solution, and then making the detergent solution get in contact with the fabric.

10. The antimicrobial detergent composition according to claim 1, wherein an amount of a nonionic surfactant with a low critical micelle concentration in the antimicrobial detergent composition is less than or equal to 25% of a total mass of the surfactant.

* * * * *